United States Patent
Shnitko et al.

(10) Patent No.: US 10,375,154 B2
(45) Date of Patent: Aug. 6, 2019

(54) INTERCHANGEABLE RETRIEVAL OF CONTENT

(71) Applicant: Microsoft Technology Licensing, LLC, Redmond, WA (US)

(72) Inventors: Yauhen Shnitko, Sammamish, WA (US); Victor Magidson, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 303 days.

(21) Appl. No.: 15/365,733

(22) Filed: Nov. 30, 2016

(65) Prior Publication Data

US 2018/0034901 A1     Feb. 1, 2018

Related U.S. Application Data

(60) Provisional application No. 62/368,739, filed on Jul. 29, 2016.

(51) Int. Cl.
*H04L 29/08* (2006.01)
*G06F 16/955* (2019.01)

(52) U.S. Cl.
CPC ........ *H04L 67/1002* (2013.01); *G06F 16/955* (2019.01); *H04L 67/02* (2013.01);
(Continued)

(58) Field of Classification Search
CPC ..... H04L 67/02; H04L 67/10; H04L 67/1002; H04L 67/1004; H04L 67/1023;
(Continued)

(56) References Cited

U.S. PATENT DOCUMENTS 6,823,377 B1 * 11/2004 Wu ..................... H04L 67/2842
709/223
7,096,266 B2    8/2006 Lewin et al.
(Continued)

FOREIGN PATENT DOCUMENTS

CN        104580177 A     4/2015

OTHER PUBLICATIONS

Walter, Sandpiper, Akamai Unleash High-Performance Content Delivery, The Seybold Report on Internet Publishing, vol. 3, No. 12, Aug. 1999 (Year: 1999).*
(Continued)

*Primary Examiner* — Vivek Srivastava
*Assistant Examiner* — William C McBeth
(74) *Attorney, Agent, or Firm* — Merchant & Gould

(57) ABSTRACT

The present disclosure provides for improved computational efficiency in systems used to provide content over a network. Hybrid content sourcing is enabled to provide content via a Content Distribution System (CDN) and a centralized service in conjunction with one another via a single URL provided to client devices. A hash map is updated and provided to the client devices to allow a tenant to control and change how content is distributed without needing to modify the applications or multiple content items that are used by the client devices. Tenants are thereby enabled to include or exclude the CDN as an available source of content without disrupting operation of the centralized service or the client devices. Individual content assets or libraries of content assets may thereby be interchangeably provisioned via a single Uniform Resource Locator.

19 Claims, 8 Drawing Sheets

(52) U.S. Cl.
CPC .......... *H04L 67/10* (2013.01); *H04L 67/2842* (2013.01); *H04L 67/2847* (2013.01)

(58) Field of Classification Search
CPC ............. H04L 67/1031; H04L 67/1095; H04L 67/2814; H04L 67/2842; H04L 67/2847
See application file for complete search history.

(56) References Cited

U.S. PATENT DOCUMENTS

| | | | |
|---|---|---|---|
| 7,376,716 | B2 | 5/2008 | Dilley et al. |
| 8,397,073 | B1 | 3/2013 | Richardson et al. |
| 8,661,056 | B1 | 2/2014 | Cinarkaya et al. |
| 8,769,614 | B1 | 7/2014 | Knox et al. |
| 9,088,634 | B1 | 7/2015 | Corley et al. |
| 9,160,704 | B2 | 10/2015 | Wein et al. |
| 9,392,075 | B1 | 7/2016 | Radovnikovic |
| 9,549,038 | B1 * | 1/2017 | Anne ................. H04L 67/2842 |
| 2002/0163882 | A1 | 11/2002 | Bornstein et al. |
| 2003/0191822 | A1 | 10/2003 | Leighton et al. |
| 2004/0093419 | A1 | 5/2004 | Weihl et al. |
| 2007/0168517 | A1 | 7/2007 | Weller et al. |
| 2008/0155061 | A1 | 6/2008 | Afergan et al. |
| 2009/0254661 | A1 | 10/2009 | Fullagar et al. |
| 2011/0116376 | A1 | 5/2011 | Pacella et al. |
| 2013/0018978 | A1 * | 1/2013 | Crowe ................. H04L 67/2842 709/214 |
| 2013/0297735 | A1 | 11/2013 | Wein et al. |
| 2014/0059248 | A1 | 2/2014 | Leighton et al. |
| 2014/0108474 | A1 * | 4/2014 | David ................. H04L 67/2842 707/827 |
| 2014/0115724 | A1 | 4/2014 | van Brandenburg et al. |
| 2014/0173729 | A1 * | 6/2014 | Cappos ................. H04L 63/168 726/22 |
| 2014/0181186 | A1 | 6/2014 | Stevens et al. |
| 2014/0189069 | A1 | 7/2014 | Gero et al. |
| 2014/0223017 | A1 | 8/2014 | Lipstone et al. |
| 2014/0372589 | A1 | 12/2014 | Newton et al. |
| 2015/0100660 | A1 | 4/2015 | Flack et al. |
| 2015/0207660 | A1 * | 7/2015 | Sundaram ........... H04L 67/2814 709/203 |
| 2015/0288647 | A1 | 10/2015 | Chhabra et al. |
| 2016/0057195 | A1 | 2/2016 | Jaskiewicz |
| 2018/0077222 | A1 | 3/2018 | Shnitko et al. |

OTHER PUBLICATIONS

O'Brien, Chris, "Office 365 performance—our Azure CDN image renditions solution", Published on: Mar. 31, 2016 Available at: http://www.sharepointnutsandbolts.com/2016/03/office-365-performance-cdn-image-renditions-solution.html.

O'Brien, Chris, "Office 365 performance—image renditions causing slow page loads in SharePoint Online", Published on: Mar. 22, 2016 Available at: http://www.sharepointnutsandbolts.com/2016/03/office-365-sharepoint-performance-image-renditions.html.

"Static Content Hosting Pattern Issues and Considerations", Published on: Jun. 7, 2014 Available at: https://msdn.microsoft.com/en-us/library/dn589776.aspx.

"Using content delivery networks with SharePoint Online", Retrieved on: Jul. 13, 2016 Available at: https://support.office.com/en-us/article/Using-content-delivery-networks-with-SharePoint-Online-9a64268c-0b74-4eaa-b971-fb6380b1b165.

"How does a CDN work?", Retrieved on: Jul. 13, 2016 Available at: https://wpengine.com/support/how-does-a-cdn-work/.

"AT&T Content Delivery Network", Published on: Jan. 21, 2013 Available at: https://www.business.att.com/content/productbrochures/content-delivery-network.pdf.

Soper et al., "Pre-load assets on an Azure CDN endpoint", Retrieved on: Jul. 13, 2016 Available at: https:// azure.microsoft.com/en-us/documentation/articles/cdn-preload-endpoint/.

Mann, Edd, "Providing Local JS and CSS Resources for CDN Fallbacks", Published on: Jan. 29, 2014 Available at: http://eddmann.com/posts/providing-local-js-and-css-resources-for-cdn-fallbacks/.

Lau et al., "Best practices to architect applications in the IBM Cloud", Published on: Feb. 15, 2011 Available at: http://resources.idgenterprise.com/original/AST-0045549_ibm_cloudapppractices.pdf.

Benchaita, et al., "Stability and optimization of DNS-based request redirection in CDNs", In Proceedings of the 17th International Conference on Distributed Computing and Networking, Article 11, Jan. 4, 2016, 10 Pages.

"International Search Report and Written Opinion Issued in PCT Application No. PCT/US2017/050000", dated Nov. 28, 2017, 11 Pages.

"International Search Report and Written Opinion Issued in PCT Application No. PCT/US2017/041810", dated Oct. 12, 2017, 22 Pages.

* cited by examiner

MOBILE COMPUTING DEVICE

INTERCHANGEABLE RETRIEVAL OF CONTENT

CROSS-REFERENCES TO RELATED APPLICATIONS

The present disclosure claims priority to U.S. Provisional Patent Application No. 62/368,739 filed Jul. 29, 2016, the disclosure of which is hereby incorporated by reference in its entirety.

BACKGROUND

Choosing a method to distribute content over the Internet often requires tradeoffs to be made in the speed of delivery and the level of control over that content. Using a central distribution point, such as a central cloud service, allows a content provider greater control over which clients access the content and greater ability to update the content, but clients need to be authenticated and the central service may be located far away from the client—slowing the speed of delivery. Using a content distribution network (CDN), however, allows clients to more quickly access content as edge servers are positioned across a geographic area, but at the expense of the provider's control and ability to update that content because the content needs to be distributed throughout a CDN, and may not include access controls as a result. Developers and providers of content are forced to choose between one method of delivery or another, and changing the delivery method is often unwieldy, time consuming, and resource intensive.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

A hybrid content provisioning system and methods for the use thereof are described in the present disclosure. As described herein, a content provider may designate content to be provided via a central cloud service and content to be provided via a content distribution network (CDN) and quickly transition which content source provides the content to the clients. The clients are thus provided with content faster than in environments where only a central cloud service is used and the content providers are given greater control over the access rights and ability to provide updated content than in environments where only a CDN is used. By employing the present disclosure, computing devices may improve their functioning by reducing the amount of data that need to be transmitted among each other and reduce the amount of processing resources that need to be expended to share content over the Internet quickly and securely.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
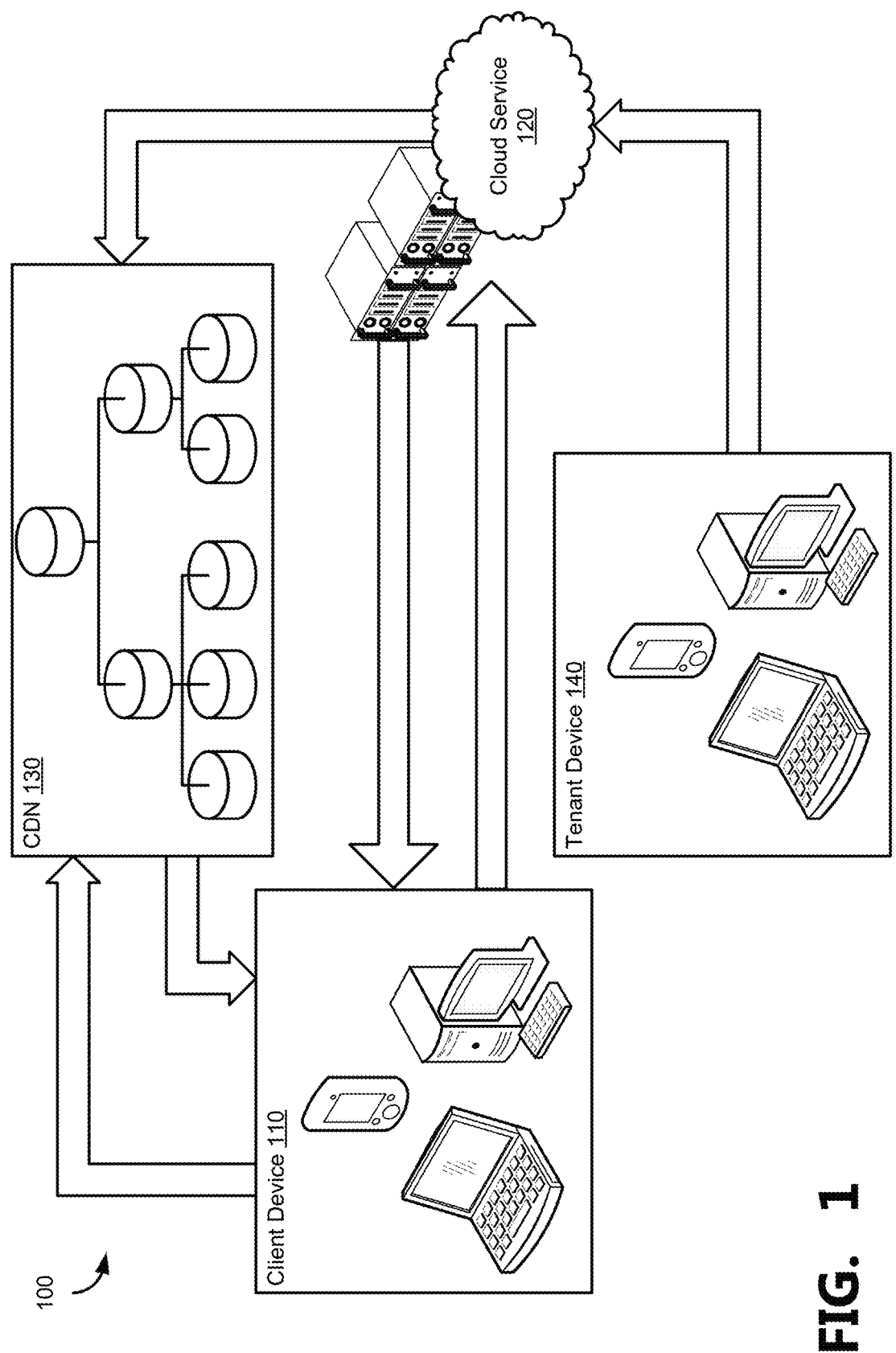
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

A hybrid distribution system and methods that make use of a cloud service and a content distribution network (CDN) are described herein. The cloud service and the CDN comprise one or more computing devices configured to receive content from the tenant and share it via a network (e.g., the Internet) with clients that request it. The cloud service is a structured service that provides a centralized source for content that may include access controls to that content. The CDN is a public content provider that uses the cloud service as its source and distributes the content over a wider geographic area than the cloud service, to provide content faster and with less overhead than the cloud service. The tenant seeking to distribute content is enabled to set which content assets are distributed via the cloud service and which are distributed by the CDN, and may quickly enable or disable the CDN as an available source for content assets without needing to configure how the content is distributed in the CDN and with minimal impact to the client.

FIG. 1 illustrates an example environment 100 in which the present disclosure may be practiced. As illustrated, a client device 110 is operable to communicate requests to the cloud service 120 and to receive content from a cloud service 120 and a CDN 130. The cloud service 120 is in communication with a tenant device 140, by which the content provider may upload or remove content from cloud service 120 and may set how that content is to be made available to the client devices 110. The cloud service 120 is also in communication with the CDN 130 to provide the CDN 130 with the content assets to enable the CDN 130 as an available content source to the client device 110 based on commands from the tenant device 140. In various aspects, the commands from the tenant device 140 that include configuration settings for the CDN 130 may be transmitted directly to the CDN 130 or may be forwarded by the cloud service 120 from the tenant device 140.

The client device 110 and tenant device 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 5, 6A, and 6B. Client devices 110 are operated by clients, who may be humans or automated systems (e.g., "bots") that request content. For example, an instance of the SIRI®, GOOGLE NOW™ or CORTANA® electronic assistant (available from Apple, Inc. of Cupertino, Calif.; Alphabet, Inc. of Mountain View, Calif.; and Microsoft, Corp. of Redmond, Wash., respectively) may request content in response to or in anticipation of queries from a human user. Similarly, tenant devices 140 are operated by tenants, who may be humans or automated systems that provide and manage content that is available for clients to request. In various aspects, the tenant and the client may be the same entity, such as, for example, when a developer posts a webpage (as a tenant) and then verifies that the webpage displays properly by visiting (as a client) the live version of that webpage.

The cloud service 120 stores content for the tenant to provide to the client over a network (e.g., the Internet). In various aspects, the cloud service 120 may be operated by the tenant or by a third party on behalf of the tenant at the tenant's direction. The cloud service 120 may be a structured storage service or collaboration tool that is operable to restrict what content is available to certain clients. For example, a tenant may post content that is publically available so that any potential client may request and receive that content, but a tenant may also post content that is only available to a restricted set of potential clients (e.g., private to one entity, shared among a selected whitelist of entities, blocked from sharing according to a blacklist of entities). For example, one or more content items may be hosted in cloud services 120 such as ALFRESCO™ (available from Alfresco Software, Inc. of Atlanta, Ga.), HUDDLE™ (available from Huddle, Inc. of London, UK), GOOGLE DRIVE™ (available from Alphabet, Inc. of Mountain View Calif.), WORDPRESS™ (available from Automattic, Inc. of San Francisco, Calif.), SHAREPOINT® (available from Microsoft, Corp. of Redmond, Wash.), but may include other enterprise or personal content management systems.

Content may be organized within the cloud service 120 according to various "libraries," "folders," or "sites" that may have various permission levels. The cloud service 120, when a request for content is received, will determine whether the requesting client is associated with the appropriate permission level to access the requested content, and may require the client device 110 to provide authentication (e.g., an authentication token, a username/password pair) before the requested content is transmitted to the client device 110.

A CDN 130 comprises a series of computing devices arranged in a tiered structure. Content is retrieved from a source (also referred to as a headend) and is cached in progressively lower tiers of computing devices comprising the CDN 130 until the content is cached on an edge server for transmission to a client device 110 requesting that content. The edge servers comprising the CDN 130 are widely distributed geographically so that content can be served to clients with less lag than a single centrally located content source; improving the speed at which content requests are responded to.

When an edge server does not have the content requested by a client, it will request that content from the next higher tier in the CDN 130, which in turn may forward the request to progressively higher tiers until a content source is reached, and the content is distributed through the chain of intermediary servers for provision to the edge server and is transmitted to the client device 110. The servers comprising the CDN 130 may be pre-populated by the administrators of the CDN 130 in anticipation of client requests or may be populated in response to client requests; only those edge servers (and the servers in tiers above them) in communication with clients who have made requests for a given content asset will store the given content asset.

Each server comprising the CDN 130 may cache the content for a different length of time that may be configured by a tenant employing the CDN 130 or an administrator of the CDN 130 to free storage resources when the content item has not been requested for a given length of time or to comply with the retention policy for the content asset. For example, if no clients request a given content item from a first edge server for n days, the content item may be marked to be overwritten on the first edge server or may be deleted from the first edge server, but a second edge server may maintain the content item in its cache independently of the first edge server. Additionally, the next higher tier (from which the first edge server received the content item) may retain the content item for (n+1) days without a client or edge server request for the content item to reduce the amount of data that need to be transferred between tiers of the CDN 130 if the content is requested again from an edge server after n days since the last request.

A publically available CDN 130, unlike the cloud service 120, does not need to authenticate a given client's permission levels; any requesting client with knowledge of a given Uniform Resource Locator (URL) hosted in the CDN 130 can receive the content asset associated with that URL. In some aspects, the CDN 130 may be managed by the tenant, but in other aspects may instead be a service provided by a third party to distribute the tenant's content more quickly to clients, who may be spread across multiple locations. Examples of third parties that provide CDNs 130 include, but are not limited to: Akamai Techs., Inc. of Cambridge, Mass.; Limelight Networks, Inc. of Tempe, AZ; and Level 3 Communications, Inc. of Broomfield, CO.

As will be appreciated, by not performing access control operations, the CDN 130 may provide content with less overhead (e.g., without performing authentication) than the cloud service 120, thus expending fewer processing resources and providing the content faster to the client device 110 than the cloud service 120 can. Content assets may take time to propagate through the tiers of a CDN 130 however, and individual content assets may be unavailable from the CDN 130 due to the sensitivity of the content asset (a privacy or security policy) or the frequency at which it is updated; the CDN 130 is better suited to static content assets that the tenant does not mind being exposed publically, whereas the cloud service 120 is better suited to dynamic content assets or content assets that the tenant does not want to be exposed publically. The hybrid system disclosed herein allows the tenant to tailor which content assets are available from each of the cloud service 120 and the CDN 130 to thereby make use of the advantages of each content provisioning system to improve the efficiency and speed of the systems used in accessing content.

The tenant may signal from the tenant device 140 which content assets that are stored in the cloud service 120 are allowed to be shared via the CDN 130. In response, the CDN 130 uses the cloud service 120 as its source from which to cache and distribute the assets to appropriate tiers within the CDN 130. The tenant may signal from the tenant device 140 when one or more content assets are no longer allowed to be shared via the CDN 130 by transmitting a cache invalidation request to the CDN 130 and removing the cloud service 120 as a source for the given content assets in the CDN 130. As will be appreciated, the cloud service 120 may also transmit a cache invalidation request while leaving the content asset available from the cloud service 120 to the CDN 130 to force the CDN 130 to request the newest version of a content asset to provide clients with newer or up-to-date versions of that content asset.

The client device 110 accesses the content via a web browser or other application that requests content items according to URLs associated with the content items. As will be appreciated, web browsers often have limits on the number of concurrent requests for content that they may make to a single source, and content requests can often depend from one another; making small improvements to the speed for retrieving an individual content asset have a large impact on content items comprised of many assets. For example, a client accessing a website as a content item may request the webpage itself, which includes the Hypertext Markup Language (HTML) source for the webpage as well as multiple design elements such as JavaScript files, cascading style sheets (CSS), embedded videos, audio files, images, etc., which all need to be requested from their associated sources, and these elements may further specify other content assets that will later need to be requested (e.g., an image specified within a CSS) for the client to fully receive the content item.

Figure 2:
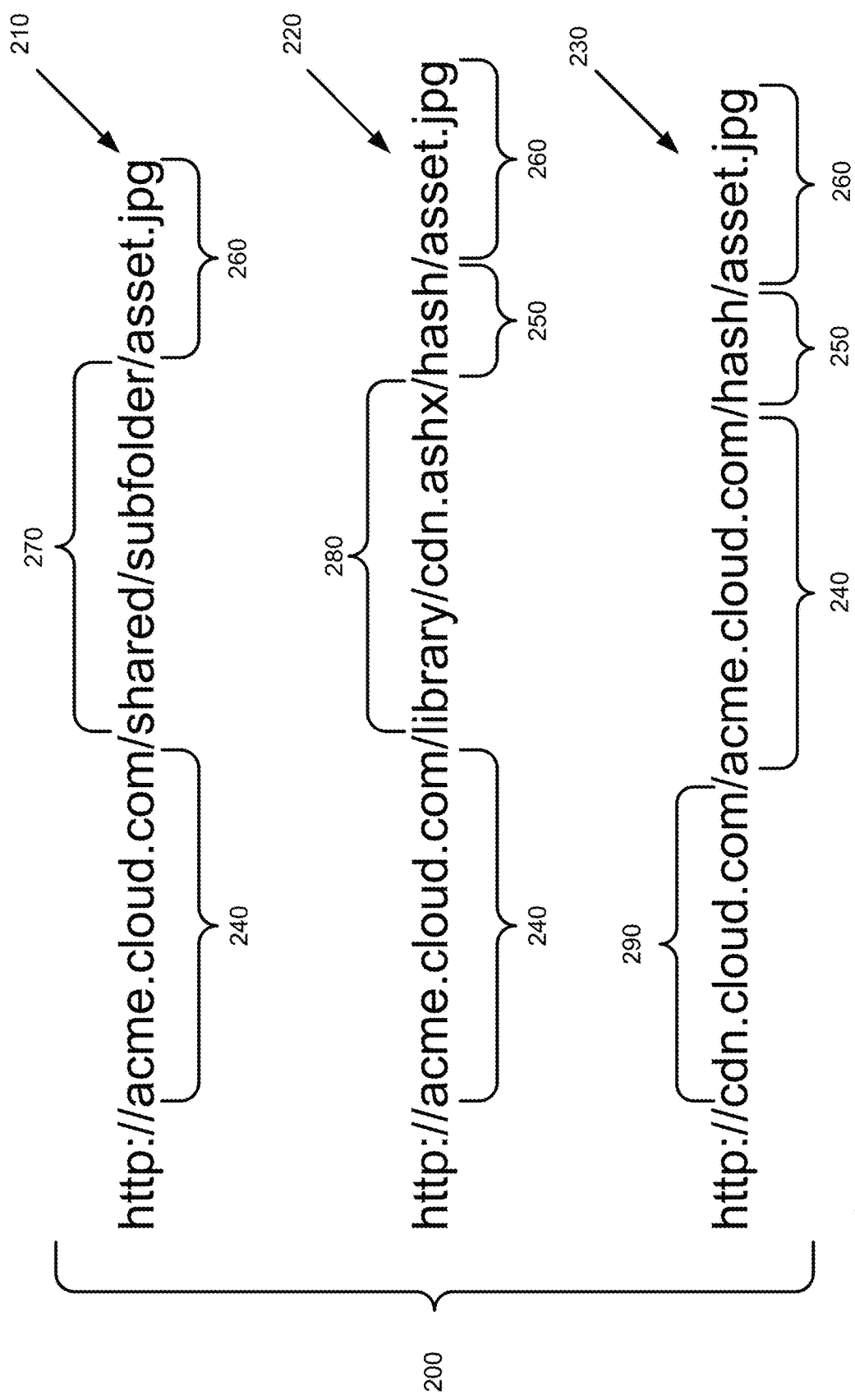
FIG. 2 illustrates an example URL set for a given content asset.

FIG. 2 illustrates an example URL set 200 for a given content asset. Several variations of URLs are discussed herein for retrieving content from various sources, and the example URLs comprising the URL set 200 all point to the same example content asset for purposes of providing non-limiting examples of those URLs and their component elements.

A provided URL 210 is transmitted to the client device 110 along with a hash value 250 from the cloud service 120 in response to an initial request from the client device 110 after the client has been authenticated. For example, the client device 110 may request a webpage from the cloud service 120, which after authenticating the client, returns the webpage, but the webpage requests additional content assets via the provided URLs 210 in the HTML structure comprising the webpage. The provided URL 210 points to a given asset in the cloud service 120 and the cloud service 120 will attempt to authenticate any client who requests the given content asset using the provided URL 210.

The provided URLs 210 may be dynamically called out in the HTML, JavaScript, or other structure of a content asset that includes requests for additional assets, or may be statically coded into that structure. Alternatively, when the CDN 130 is a valid source, the source may convert the provided URLs 210 into the CDN URLs 230 for the client device 110. When a provided URL 210 is dynamic, it will be called out as dynamic so that the client device 110 will know that is not a static URL and the client device 110 will need to make the determination as to whether the provided URL 210 may be converted to request the content asset from the cloud service 120 or the CDN 130. For example, a source of a content asset may be defined in an anchor as a function call for its URL (e.g., <img src="URLprovider.URLconversionEnabled(cloudURL)">, img.Src=URLprovider.URLconversionEnabled(cloudURL)) or via a tag for a content asset (e.g., <img src="cloudURL" convertible="true">, img.Src.convertible=CloudURL) when a user agent on the client device 110 is operable to handle such tags within content asset definitions. In contrast, a static URL would be called out without a function call in its anchor, without a tag in its anchor designating it as dynamic, or with a tag in its anchor designating it as static. As will be appreciated, even if a content asset were designated as dynamic, the client device 110 may still treat the content asset as static (based on user or system preferences) and request it only from the cloud service 120.

Elements of the provided URL 210 include: a host value 240, pointing to higher divisions of cloud service's URL (e.g., before a first forward slash in a URL address); a provided internal file path 270, specifying intermediary portions of the provided URL 210; and an asset identifier 260, pointing to the given content asset that is located at the end of the provided URL 210. Although illustrated as occurring after the last forward slash in the URL, the asset identifier 260 may include more than one forward slash delineated segment in different aspects. As will also be appreciated, although the protocol (e.g., http://, https://, ftp://) is not discussed as part of the URL set 200, one of ordinary skill in the art will recognize that URLs will reference a protocol to be used for requesting the content linked via the URL and the present disclosure is operable to work with several protocols.

A source URL 220 points to the content asset as it is hosted in the cloud service 120 for use by the CDN 130 as a source. The only client who can access the content item via the source URL 220 is the CDN 130; for example, any request from an IP address other than an IP address associated with the CDN 130 will be blocked (e.g., via an IP address whitelist or HMAC (hash-based message authentication code) headers associated with the CDN 130). The cloud service 120 provides the content assets from the source URL 220 to the CDN 130 without further authentication beyond identifying that the request came from the CDN 130. The source URL 220 includes: the host value 240, pointing to higher divisions of the cloud service's URL; a cloud file path 280, specifying intermediary portions of the source URL 220; a hash value 250; and an asset identifier 260, pointing to the given content asset that is located at the end of the source URL 220. Although illustrated as occurring after the last forward slash in the URL, the asset identifier 260 may include more than one forward slash delineated segment in different aspects. As will also be appreciated, the cloud file path 280 and the provided internal file path 270 point to different storage locations in the cloud service 120, which apply different authentication or access control features.

A CDN URL 230 points to the content asset as it is hosted by the CDN 130. The CDN URL 230 includes: a CDN address 290, that points to the top divisions of the tenant's addresses on the CDN 130; the host value 240, from the tenant's cloud service 120; the hash value 250; and the asset identifier 260, pointing to the given content asset that is located at the end of the CDN URL 230. Because the CDN 130 does not require authentication, the hash value 250 included in the CDN URL 230 provides a measure of privacy in the location of the content asset.

The hash value 250 is produced according to the output of a hash function based on information contained in the provided URL 210 and the hash value 250 itself. A hash function yields a one-way encryption of data, which may be done according to various algorithms known to those of ordinary skill in the art (SHA-2, SHA256, MD5, BLAKE2, Keccak, GOST, etc.). In various aspects, the hash value 250 may include additional information about itself related to: identifying a version of the hash construction rules, a signature or checksum for the hash value 250, a length of the portion of the URL that was hashed, as well as the output of the hash function itself. The hash value 250 is created on the cloud service 120 for the location specified by the tenant device 140 by running the hash function on at least a portion of the provided URL 210. In various aspects, to ensure consistent formatting of the provided URL 210, the provided URL 210 may be converted to all uppercase, all lowercase, or another normalization of character encodings before being hashed. The entire provided URL 210 may be hashed, resulting in a unique hash value 250 for each content asset, or only the first X characters (e.g., the host value 240 and at least a portion of the internal file path 270) of the provided URL to provide hash values 250 that are shared for a given file path. The content asset(s) are then hosted by the cloud service 120 at the source URL 220, and when the CDN 130 is enabled as a content source, the CDN 130 will be provided the CDN URL 230 and will construct the source URL 220 via internal logic to retrieve the content assets from the cloud service 120 as a source to host the content asset(s) in the CDN 130 according to the CDN URL 230.

The hash values 250 obtained from each provided URL 210 for a given content asset are included in the associated source URL 220 and CDN URL 230. All of the hash values 250 used to construct CDN URLs 230 hosted from the cloud service 120 are included in a hash map that is provided to the client device 110 when parent content assets (e.g., webpages referencing child content assets such as CSS files, JavaScript objects, images, etc.) are requested and the client is successfully authenticated. A provided hash map may include all of the hash values 250 for content assets that a tenant has designated for sharing via the CDN 130 or only those content assets that are referenced from a parent content asset. For example, if a tenant chooses to share via the CDN 130 two content assets for background images where each is unique to one of two webpages, the hash map for each webpage may include the hash value 250 for the CDN URL 230 for the background image associated with other webpage or may exclude the hash value 250 for the CDN URL 230 for the background image associated with the other webpage. By using a single hash map, the tenant may have a single point to update when a content source is changed, but by using multiple hash maps, the amount of data transmitted to clients may be reduced. Hash maps allow for greater privacy for CDN URLs 230 to be realized, as the CDN URLs 230 themselves are not transmitted to the client devices 110. One of ordinary skill in the art will appreciate the tradeoffs associated with using one or more than one hash map for a given deployment.

The hash values 250 allow the client device 110 to determine whether a given content asset is available from the CDN 130 without needing to directly query the CDN 130 for the content's availability. A new hash map may be provided to the client device 110 each time the client is authenticated, after a set period of time (e.g., every 30 seconds, every 24 hours), or in response to the tenant updating the content asset's availability relative to the CDN 130 so that the client will have up-to-date knowledge of which content assets are available from the CDN 130.

When the client device 110 identifies a provided URL 210 that is dynamic, the client device 110 will hash the provided URL 210 (or a portion thereof) and compare the output with the output portions of hash values 250 (e.g., not the checksum, version number, length portions) included in the hash map. When a hash value 250 from the hash map is identified as including the output of the hash function for the provided URL 210, the client device 110 will construct and then use the associated CDN URL 230 to request the given content asset. When no hash value 250 from the hash map is identified as including the output of the hash function for the provided URL 210, the client device 110 will use the provided URL 210 to request the content asset from the cloud service 120.

The client device 110 will construct the CDN URL 230 from the provided URL 210 and the hash value 250 when a hash value 250 for the provided URL 210 is found in the hash map. In aspects where the asset identifier 260 is removed, the hash values 250 may be computed from the host value 240 and the internal file path 270 of the provided URL 210. The client device 110, when converting from the provided URL 210 to the CDN URL 230 for a given content asset, will add the asset identifier 260 to the identified URL stored in the URL map to complete the CDN URL 230 for a given content asset. As a pre-check in some aspects, the client device 110 uses the length of the portion of the provided URL 210 to be hashed and checks that length to the length values identified in the hash map's hash values 250 to reduce the number of comparisons needed to be made to those hash values 250 of a matching length, or to use the provided URL 210 as-is (without running a hash function), when no hash value 250 in the hash map is of a matching length to the portion of the provided URL 210.

The CDN 130 uses the cloud service 120 as its source, and content assets from the cloud service 120 are hosted at the defined CDN URLs 230 by the CDN 130.

When the CDN 130 is enabled as a content source by the tenant, the content assets may be distributed within the CDN 130 automatically or based on client requests for the content assets at the CDN URLs 230. When the CDN 130 receives a request for a content asset that it does not currently possess, it may send a request to a higher tier within the CDN 130 or the cloud service 120 to retrieve that content asset. If the content cannot be retrieved from a higher tier, or the URL does not point to a valid content asset for the CDN 130 to serve, the CDN 130 will respond to the client device 110 that the CDN 130 is not a valid source (e.g., via a 401, 403, 404, 410, 421, or 451 error—see, IETF RFC 7231) and the client device 110 may request the content asset from the cloud service 120 by using the provided URL 210.

As will be appreciated, the text and order of elements given in the illustrated example may be modified from what is shown in FIG. 2 to meet the needs of various implementations; one of ordinary skill in the art will recognize FIG. 2 and the associated discussion as providing a non-limiting explanation of a URL set 200. The format of the URLs comprising the URL set 200 allows for the conversion from one URL to another. The elements of each URL that are shared in common may be reordered according to a definition provided via tenant-supplied logic (e.g., as part of a CSS or JavaScript file provided from the tenant) to the client device 110 or CDN 130, and any elements that are unique to one URL may similarly be removed or inserted during a conversion based on a definition provided to the client device 110 or CDN 130.

Figure 3:
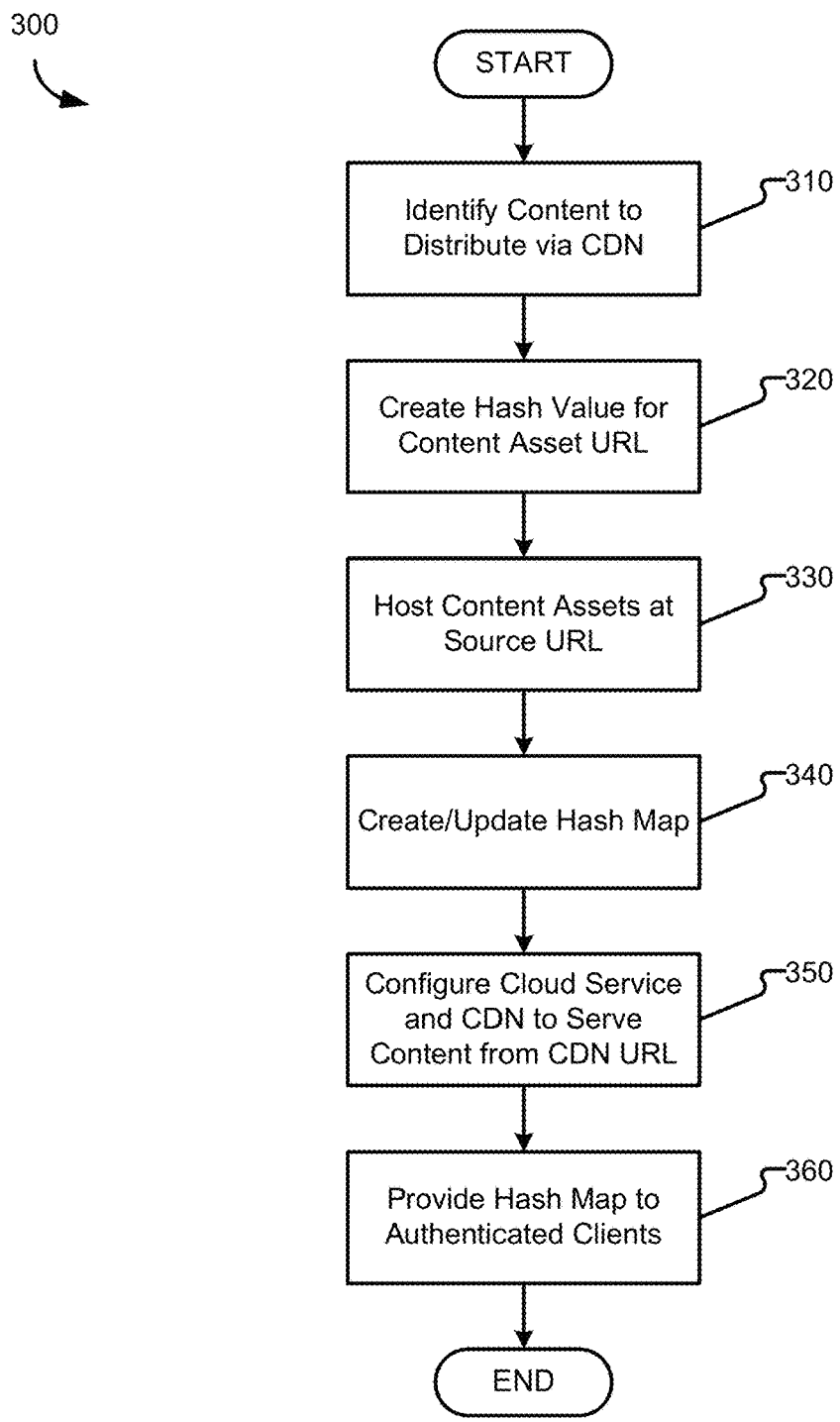
FIG. 3 is a flow chart showing general stages involved in an example method for enabling hybrid content sourcing for the interchangeable retrieval of content when providing a single address.

FIG. 3 is a flow chart showing general stages involved in an example method 300 for enabling hybrid content sourcing for the interchangeable retrieval of content when providing a single address. Method 300 may be performed in response to the first or a subsequent time that hybrid content sourcing is enabled by a tenant. Content assets may include, as parent assets, links that are formatted as dynamic URLs to child content assets or design elements. For example, a content asset of an HTML, CSS, or JavaScript object may reference another content asset via a dynamic URL. Content assets provided to client devices 110 may include dynamic URLs prior to or after the conclusion of method 300, but those dynamic URLs will resolve to the provided URL 210 for the content asset (hosted by the cloud service 120) until method 300 has concluded.

Method 300 begins at OPERATION 310, where a tenant identifies content to distribute via the CDN 130 to supplement the distribution of content via the cloud service 120. Which content assets are shared via a CDN 130 and which are limited to distribution via the cloud service 120 for a given tenant may be an issue for an intellectual property management policy for content assets and/or a frequency of use or update of those content assets; tenant preferences dictate which content assets are identified as to be distributable via a CDN 130.

The identified content will have the URL at which it is hosted for client consumption (i.e., the provided URL 210) hashed at OPERATION 320, and that hash will be used to create the hash value 250 for that content asset. In some aspects, the hash value 250 includes version information, URL length information, and a checksum or signature in addition to the output of the hash of the provided URL 210. In yet other aspects, the provided URL 210 is hashed without an asset identifier 260 so that multiple content assets using similar file paths but for different asset identifiers 260 may use the same hash value 250.

At OPERATION 330 the hash value 250 is used to construct a source URL 220 at which the content asset is hosted for consumption by the cloud service 120 as a source for the CDN 130. The cloud service 120 will only respond to requests from the CDN 130 for the content asset from the source URL 220, and even then only when the tenant has signaled to the cloud service 120 that distribution from the CDN 130 is enabled (OPERATION 350). When distribution from the CDN 130 is enabled, requests from entities other than the CDN 130 will be rejected, although the cloud service 120 may respond with an Access Denied or other appropriate error code to the requesting entity. Requests from the CDN 130 using the source URL 220 will bypass the cloud service's authentication procedures so that the CDN 130 may be more quickly populated with the requested content asset when CDN distribution is enabled. In some aspects, requests may be identified as originating from the CDN 130 via a whitelist of known IP addresses associated with the CDN 130 or Signature Header Authentication, where headers as signed with a secret that is shared between the cloud service 120 and the CDN 130.

A hash map for the content assets that are shared via the CDN 130 is created or updated at OPERATION 340 to include the hash value 250 used to construct the source URLs 220. In various aspects, the asset identifiers 260 may be included or excluded from the hash values 250 when building the hash map. Hash maps may be specific to a given parent content asset, including only the hash values 250 for child content assets for which provided URLs 210 are included in the parent content asset, may be general to the tenant's deployment, in which every CDN URL's 230 hash value 250 is included in the hash map, or may be a combination of specific and general to provide different hash maps for regions of the tenant's deployment.

At OPERATION 350 the cloud service 120 and the CDN 130 are configured to enable the CDN 130 to serve content assets. In various aspects, the configuration is signaled from a tenant device 140 to the cloud service 120, which in turn signals the CDN 130 to begin requesting content hosted in the cloud service 120 via the designated source URLs 220. The cloud service 120 may provide the CDN 130 with a list of source URLs 220 and logic on how to convert the source URLs 220 into CDN URLs 230 or the hash values 250 and logic to construct the URLs from the URL set 200, retention policies for the content assets in the CDN 130 (e.g., store for n days), and may provide a shared secret so that requests for content assets from the source URLs 220 may be appropriately signed. Alternatively, a tenant may provide, via a tenant device 140, the conversion logic, retention policies, or shared secret directly to the CDN 130 or have the cloud service 120 forward those data to the CDN 130.

Proceeding to OPERATION 360, the cloud service 120 will provide the updated hash map to client devices 110 that have been authenticated. In various aspects, a hash map may be pushed to the client devices 110 that are currently authenticated with the cloud service 120 for a given tenant in response to the hash map being created or updated, while in other aspects the client device 110 will receive the hash map in response to a request from the client device 110 for the hash map or along with another content asset that was requested (e.g., as part of a CSS or JavaScript object). Method 300 may then conclude.

Figure 4:
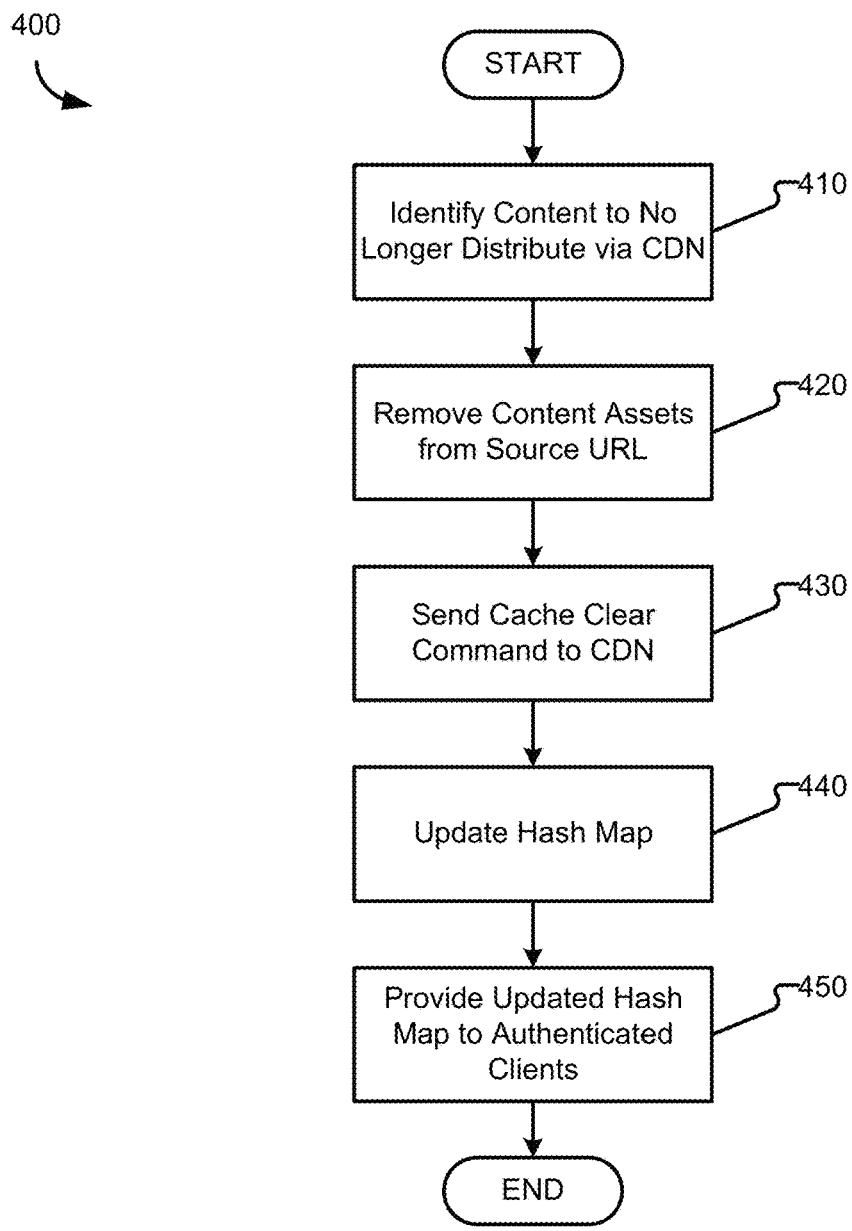
FIG. 4 is a flow chart showing general stages involved in an example method for disabling hybrid content sourcing for the interchangeable retrieval of content when providing a single address.

FIG. 4 is a flow chart showing general stages involved in an example method 400 for disabling hybrid content sourcing for the interchangeable retrieval of content when providing a single address. Method 400 may be performed in response to the tenant completely disabling the CDN 130 for content sourcing, or in response to removing one or more specific content assets or libraries of content assets from distribution by the CDN 130.

Method 400 begins at OPERATION 410 where the tenant identifies to the cloud service 120 content that is no longer to be distributed via the CDN 130 in conjunction with distribution via the cloud service 120. Content assets may be identified individually, if the hash values 250 were created to originally share those content assets on a per asset basis, otherwise, if the hash values 250 were created to identify libraries from which content assets could be shared, the libraries will be identified to remove from distribution via the CDN 130. As will be appreciated, the tenant may signal one or more content assets or libraries to be removed from distribution via the CDN 130 (up to and including all of the tenant's content) and may reenable that content for distribution via the CDN 130 at a later time according to method 300.

At OPERATION 420 the cloud service 120 stops hosting the identified content assets from the source URLs 220. In various aspects, the source URLs 220 are made unavailable; all requests that use the source URLs 220 will be rejected. In other aspects, the source URLs 220 are deleted from the cloud service 120; the content and content assets are removed. OPERATION 420 prevents the CDN 130 from repopulating its caches with content assets that are no longer to be made available from the CDN 130.

Proceeding to OPERATION 430, the tenant device 140 sends a cache clear command to the CDN 130, which in some aspects may be received and forwarded by the cloud service 120 from the tenant device 140 to the CDN 130. The cache clear command identifies the content assets that are to be unavailable for distribution from the CDN 130 and causes the CDN 130 to delete those content assets from its storage tiers or otherwise make those content assets unavailable to client devices 110 (e.g., mark for overwriting). As will be appreciated, the tenant may perform OPERATIONS 410 and 430 independently of method 400 to force the CDN 130 to update identified content assets.

The hash map that includes the hash values 250 for content assets available from the CDN 130 is updated at OPERATION 440 to remove the hash values 250 associated with the content assets that were identified at OPERATION 410. The updated hash map is then provided to authenticated client at OPERATION 450. In various aspects, a hash map may be pushed to the client devices 110 that are currently authenticated with the cloud service 120 for a given tenant in response to the hash map being updated. In other aspects, the client device 110 will receive the hash map in response to a request from the client device 110 for the hash map or along with another content asset requested (e.g., as part of a CSS or JavaScript object). Method 400 may then conclude.

Figure 5:
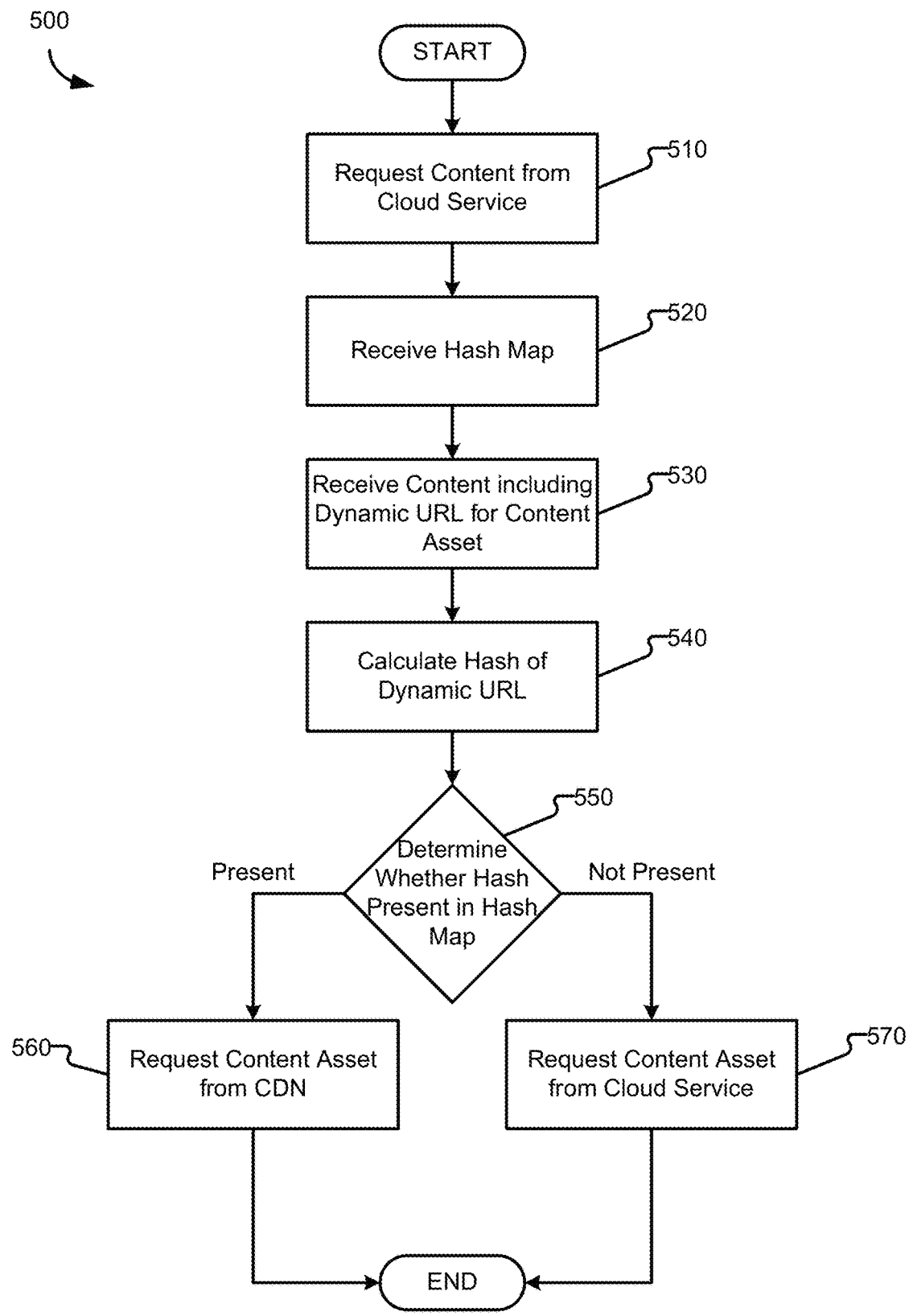
FIG. 5 a flow chart showing general stages involved in an example method for a client device to interchangeably request content assets when provided a single address via hybrid content sourcing.

FIG. 5 a flow chart showing general stages involved in an example method 500 for a client device 110 to interchangeably request content assets when provided a single address via hybrid content sourcing.

Method 500 begins at OPERATION 510, where the client device 110 transmits a request for content to the cloud service 120. The cloud service 120 will authenticate the client using the client device 110 and may provide content to the client device 110 in response to the request when the client has the appropriate permissions to access the requested content, and otherwise may reject the request. After the cloud service 120 has authenticated the client, the cloud service 120 will transmit a hash map comprising one or more hash values 250 used in CDN URLs 230 to the client device 110, which the client device 110 receives at OPERATION 520. In various aspects, the client device 110 may indicate in its request that it already has a hash map, in which case OPERATION 520 may be omitted or the hash map received by the client device 110 will replace the prior hash map.

At OPERATION 530 the client device 110 receives a parent content asset including dynamic URLs for child content assets. For example, the client may have requested a webpage (a parent content asset) that includes a URL requesting an image and a CSS (child content assets of the webpage), wherein the CSS requests another image (as a child content asset of the CSS). Dynamic URLs include a provided URL 210 that points to an address from which the cloud service 120 will provide the content asset to the client device 110, but are interpretable by the client device 110 to potentially point to an address from which the CDN 130 will provide the content asset to the client device 110.

To determine whether a dynamic URL points to the CDN 130, method 500 proceeds to OPERATION 540, where the client device 110 calculates a hash of the provided URL 210 (including or excluding an asset identifier 260 element of the provided URL 210). The client device 110 then compares the hash to the hash values 250 of the CDN URLs 230 comprising the hash map to determine, at DECISION 550, whether the hash calculated in OPERATION 540 is present in the hash map. When it is determined that the hash is present in the hash map, method 500 proceeds to OPERATION 560, otherwise method 500 proceeds to OPERATION 570.

At OPERATION 560 the client device 110 will request the content asset from the CDN 130. The CDN URL 230 constructed with the hash value 250 that was determined at DECISION 550 to include the hash calculated at OPERATION 540 is used in the request to the CDN 130. In various aspects, the client device 110 will extract the asset identifier 260 from the provided URL 210 to concatenate the CDN URL 230 for the request. Method 500 may then conclude.

At OPERATION 570 the client device 110 will request the content asset from the cloud service 120. The client device 110 will use the provided URL 210 to request the content asset from the cloud service 120, and the request may undergo further processing for authentication and content control to receive the content asset from the cloud service 120. Method 500 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
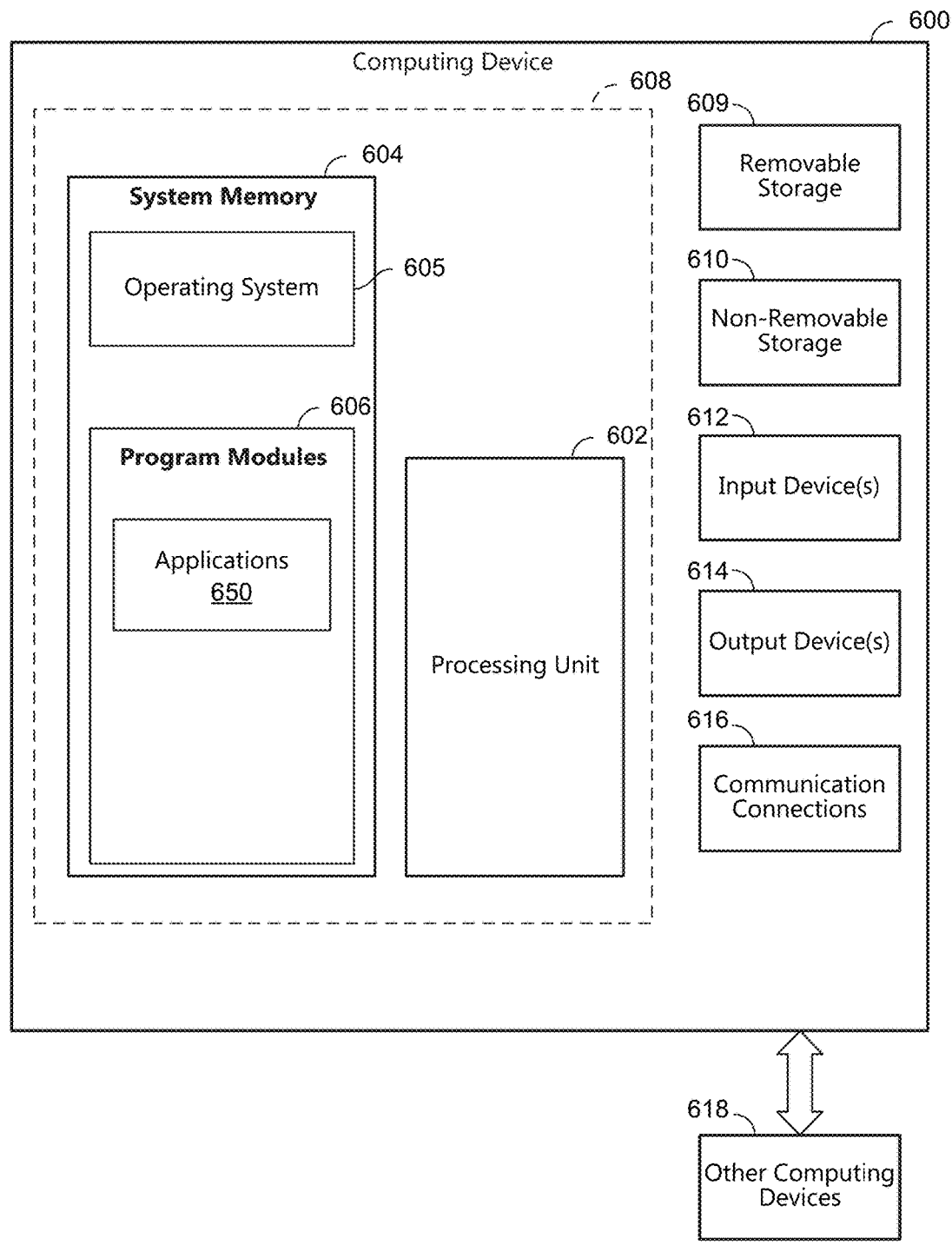
FIG. 6 is a block diagram illustrating example physical components of a computing device.
Figure 7A:
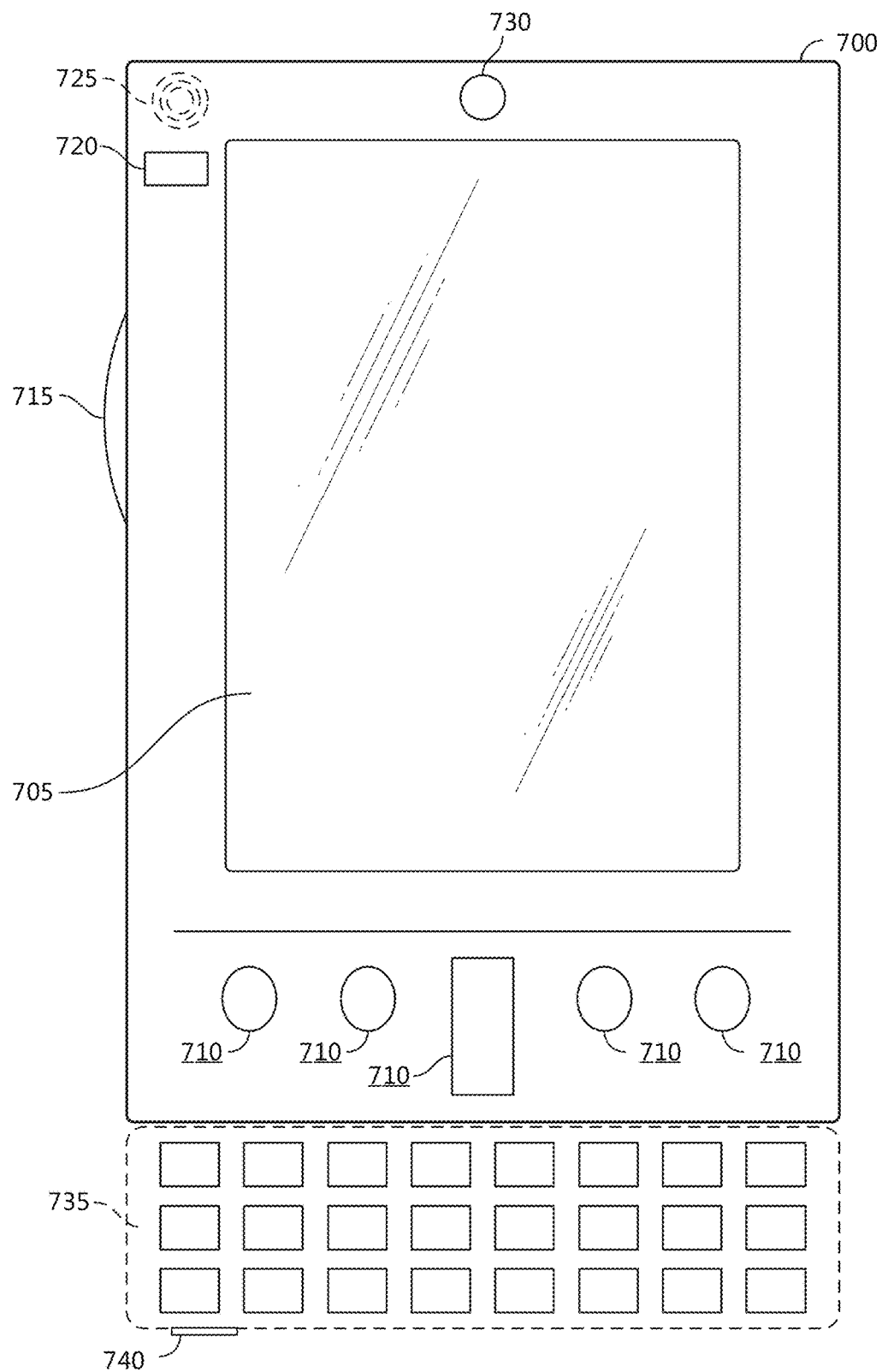
FIGS. 7A and 7B are block diagrams of a mobile computing device.
Figure 7B:
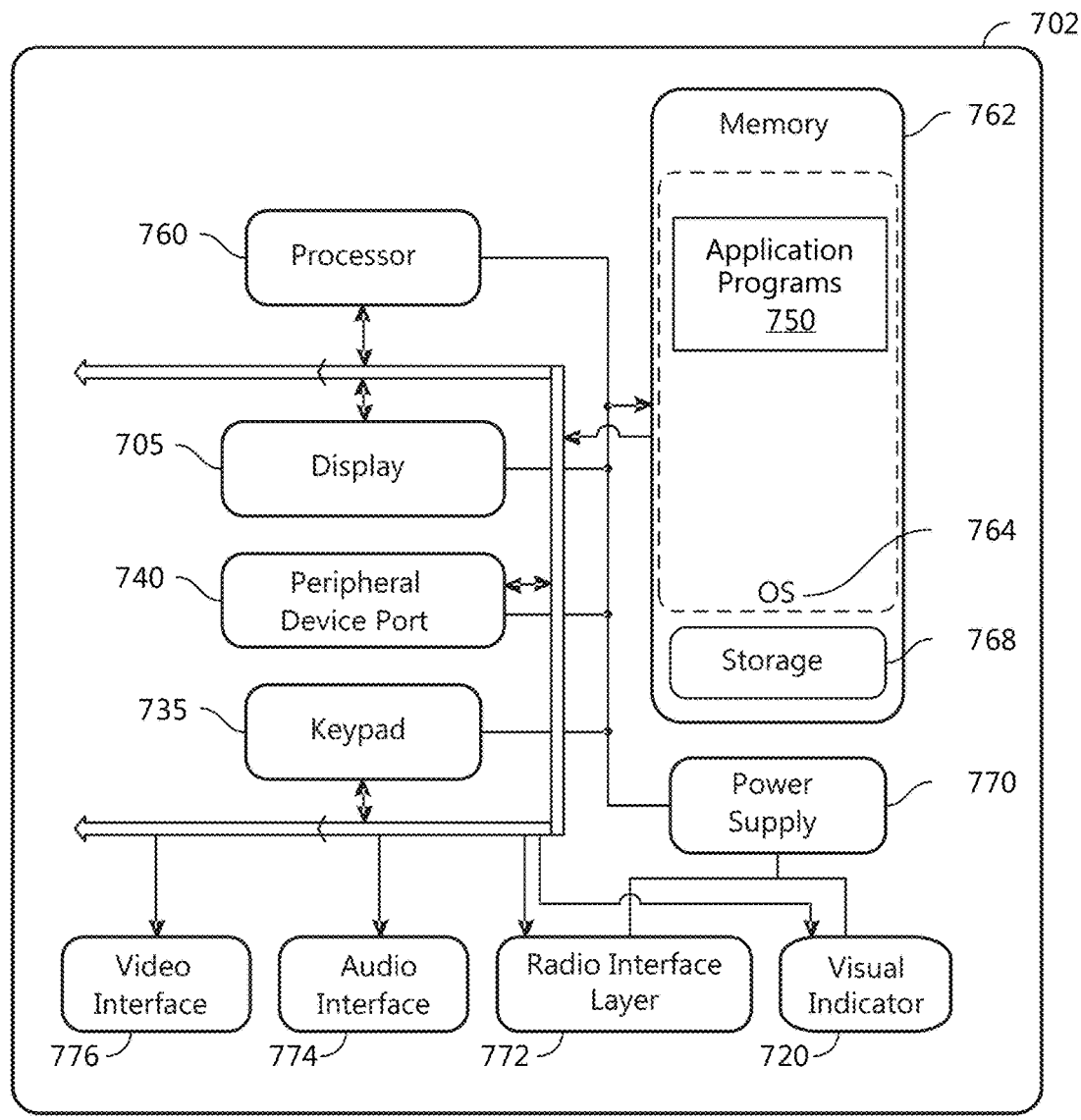

FIGS. 6-7B and the associated descriptions provide a discussion of a variety of operating environments in which examples are practiced. However, the devices and systems illustrated and discussed with respect to FIGS. 6-7B are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the application 650 includes applications by which a tenant may control the distribution of content assets via a hybrid distribution system or a client may request content according to the present disclosure. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., applications 650) perform processes including, but not limited to, one or more of the stages of the methods 300, 400, and 500 illustrated in FIGS. 3-5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or fewer input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 are stored locally on the mobile computing device 700, as described above. According to another aspect, the data are stored on any number of storage media that are accessible by the device via the radio 772 or via a wired connection between the mobile computing device 700 and a separate computing device associated with the mobile computing device 700, for example, a server computer in a distributed computing network, such as the Internet. As should be appreciated such data/information are accessible via the mobile computing device 700 via the radio 772 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method performed by a cloud service for improving computational efficiency in interchangeably sourcing content for retrieval when providing a single address, comprising:
    identifying content hosted by the cloud service to be distributed via a content distribution network (CDN), the cloud service hosting the content at a provided uniform resource locator (URL);

creating a hash value based on the provided URL;
hosting a child content asset of the content at a source URL, wherein the source URL includes the hash value;
creating a hash map comprising a CDN URL, wherein the CDN URL points to an address for the CDN to provide the child content asset to a client device and the CDN URL includes the hash value;
configuring the CDN to serve the child content asset from the CDN URL and use the source URL as a source from which to cache the child content asset in the CDN; and
providing the hash map to the client device associated with an authenticated client to enable the client device to derive the CDN URL such that the child content asset is provided from the CDN to the client device according to the CDN URL.

2. The method of claim 1, further comprising:
identifying content hosted by the cloud service to not be distributed via the CDN; and
providing the provided URL to the client device such that the content hosted by the cloud service to not be distributed via the CDN is provided from the cloud service to the client device according to the provided URL.

3. The method of claim 1, further comprising:
rejecting requests for the child content asset via the source URL that are received from requesting parties other than the CDN.

4. The method of claim 1, wherein configuring the CDN further comprises setting a retention policy for how long the child content asset is to remain cached by the CDN.

5. The method of claim 1, further comprising:
identifying a given child content asset that is currently distributed via the CDN but is no longer to be distributed via the CDN;
removing the given child content asset from being hosted at a given source URL associated with the given child content asset;
sending a cache clear command to the CDN;
updating the hash map to remove a given hash value associated with the given child content asset from the hash map; and
providing the updated hash map to the client device.

6. The method of claim 5, further comprising providing the updated hash map to the client device in response to a request for the content.

7. The method of claim 1, wherein the provided URL comprises:
a protocol identifier;
a host value;
a provided internal file path; and
an asset identifier.

8. The method of claim 7, wherein the source URL comprises:
the protocol identifier;
the host value;
a cloud file path;
the hash value; and
the asset identifier.

9. The method of claim 7, wherein the CDN URL comprises:
the protocol identifier;
a CDN address;
the host value;
the hash value; and
the asset identifier.

10. A computing device associated with a cloud service for improving computational efficiency in interchangeably sourcing content for retrieval when providing a single address, the computing device comprising:
a communication connection between at least the cloud service, a content distribution network (CDN), and a client device;
a memory storing instructions; and
a processing unit coupled to the memory, wherein upon execution of the instructions stored in the memory, the processing unit is configured to:
identify content hosted by the cloud service to be distributed via the CDN, the cloud service hosting the content at a provided uniform resource locator (URL);
create a hash value based on the provided URL;
host a child content asset of the content at a source URL, wherein the source URL includes the hash value;
create a hash map comprising a CDN URL, wherein the CDN URL points to an address for the CDN to provide the child content asset to the client device and the CDN URL includes the hash value;
configure the CDN to serve the child content asset from the CDN URL and use the source URL as a source from which to cache the child content asset in the CDN; and
provide the hash map to the client device associated with an authenticated client to enable the client device to derive the CDN URL such that the child content asset is provided from the CDN to the client device according to the CDN URL.

11. The computing device of claim 10, wherein to configure the CDN to serve the child content asset from the CDN URL and use the source URL as the source from which to cache the child content asset in the CDN, the processing unit is configured to:
provide the CDN with the source URL and logic to convert the source URL to the CDN URL.

12. The computing device of claim 10, wherein to configure the CDN to serve the child content asset from the CDN URL and use the source URL as the source from which to cache the child content asset in the CDN, the processing unit is configured to:
provide the CDN with the hash value and logic to construct the provided URL, the source URL, and the CDN URL.

13. The computing device of claim 10, wherein the processing unit is further configured to store the child content asset within the cloud service according to an access permission level associated with the child content asset.

14. The computing device of claim 13, wherein the processing unit is further configured to:
in response to receiving a request from the client device for the child content asset and prior to providing the hash map to the client device, determine the client is associated with the access permission level to access the child content asset to authenticate the client.

15. The computing device of claim 10, wherein to create the hash value based on the provided URL, the processing unit is configured to:
normalize character encodings of the provided URL; and
run a hash function on at least a portion of the provided URL.

16. The computing device of claim 15, wherein the hash value includes an output of the hash function, a version of hash construction rules, a signature or a checksum for the hash value, and a length of a portion of the provided URL that was hashed.

17. The computing device of claim 15, wherein the hash function is run on an entirety of the provided URL to create a unique hash value for the child content asset.

18. The computing device of claim 15, wherein the hash function is run on a portion of the provided URL including a host value and at least a portion of an internal file path of the provided URL to create a shared hash value for the child content asset and one or more other content assets having a same internal file path.

19. Computer storage media with instructions stored thereon for improving computational efficiency in interchangeably sourcing content for retrieval when providing a single address, the instructions comprising:
- identifying content hosted by a cloud service to be distributed via a content distribution network (CDN), the cloud service hosting the content at a provided uniform resource locator (URL);
- creating a hash value based on the provided URL;
- hosting a child content asset of the content at a source URL, wherein the source URL includes the hash value;
- creating a hash map comprising a CDN URL, wherein the CDN URL points to an address for the CDN to provide the child content asset to a client device and the CDN URL includes the hash value;
- configuring the CDN to serve the child content asset from the CDN URL and use the source URL as a source from which to cache the child content asset in the CDN; and
- providing the hash map to a client device associated with an authenticated client to enable the client device to derive the CDN URL such that the child content asset is provided from the CDN to the client device according to the CDN URL.

* * * * *